(12) United States Patent
Lee et al.

(10) Patent No.: US 7,149,176 B2
(45) Date of Patent: *Dec. 12, 2006

(54) HIGH-DENSITY OPTICAL DISC

(75) Inventors: Yong-hoon Lee, Gyeonggi-do (KR);
Han-kook Choi, Gyeonggi-do (KR);
Seok-jung Kim, Gyeonggi-do (KR);
In-sik Park, Gyeonggi-do (KR);
Chong-sam Chung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 440 days.

This patent is subject to a terminal disclaimer.

(21) Appl. No.: 10/268,076

(22) Filed: Oct. 10, 2002

(65) Prior Publication Data

US 2003/0076768 A1 Apr. 24, 2003

(30) Foreign Application Priority Data

Oct. 13, 2001 (KR) ............................ 2001-0063216

(51) Int. Cl.
*G11B 7/24* (2006.01)

(52) U.S. Cl. ............... 369/275.3; 369/282; 369/275.1

(58) Field of Classification Search ............ 369/272.1, 369/290.1, 282, 275.3; 720/718
See application file for complete search history.

(56) References Cited

U.S. PATENT DOCUMENTS

| | | | | |
|---|---|---|---|---|
| 4,423,502 A * | 12/1983 | Dil | ............................ | 369/275.3 |
| 5,243,588 A * | 9/1993 | Maeda et al. | ............... | 369/53.37 |
| 5,244,705 A * | 9/1993 | Tsurushima et al. | ........ | 428/64.4 |
| 5,317,553 A * | 5/1994 | Ohga et al. | ............... | 369/53.18 |
| 5,400,316 A * | 3/1995 | Igarashi | .................... | 369/275.1 |
| 5,650,991 A * | 7/1997 | Fujiie | ....................... | 369/53.22 |
| 5,997,276 A * | 12/1999 | Torazawa et al. | ............ | 425/566 |
| 6,128,274 A * | 10/2000 | Mori et al. | ............... | 369/275.5 |
| 6,141,316 A * | 10/2000 | Simpson | ..................... | 369/286 |
| 6,167,021 A * | 12/2000 | Yoshida et al. | ........... | 369/275.2 |
| 6,258,432 B1 * | 7/2001 | Terada et al. | ............... | 428/64.1 |
| 6,785,222 B1 * | 8/2004 | Netsu et al. | ................. | 369/286 |
| 6,804,190 B1 * | 10/2004 | Ishibashi et al. | ......... | 369/275.4 |
| 6,807,133 B1 * | 10/2004 | Ariyoshi et al. | .......... | 369/44.42 |
| 6,877,165 B1 * | 4/2005 | Aoki | ........................... | 720/710 |
| 2001/0053121 A1 * | 12/2001 | Komaki et al. | ............. | 369/283 |
| 2003/0086359 A1 * | 5/2003 | Lee et al. | ................. | 369/275.3 |

FOREIGN PATENT DOCUMENTS

| | | |
|---|---|---|
| CN | 1060173 A | 4/1992 |
| CN | 1290933 A | 4/2001 |
| EP | 1274074 A2 | 1/2003 |
| JP | 8-235368 | 9/1996 |
| JP | 2001-110094 | 4/2001 |

\* cited by examiner

*Primary Examiner*—Thang V. Tran
*Assistant Examiner*—Michael V. Battaglia
(74) *Attorney, Agent, or Firm*—Stein, McEwen & Bui, LLP

(57) ABSTRACT

A compact high-density optical disc capable of securing recording/reproducing characteristics and high-density recording capacity. The high-density optical disc has a whole diameter of 80 mm or less to 28 mm, a whole thickness in a range of 0.3–0.7 mm, and a position where data starts being recorded in a range of 27–45 mm of the diameter. Thus, an existing disc drive can be used, the size of the high-density optical disc can be reduced, and high-density recording capacity can be secured.

12 Claims, 4 Drawing Sheets

HIGH-DENSITY OPTICAL DISC

CROSS-REFERENCE TO RELATED APPLICATIONS

This application is based upon and claims priority from Korean Patent Application No. 2001-63216 filed Oct. 13, 2001, in the Korean Intellectual Property Office, the contents of which are incorporated herein by reference.

BACKGROUND OF THE INVENTION

1. Field of the Invention

The present invention relates to a high-density optical disc, and more particularly, to a high-density compact optical disc capable of securing good recording/reproducing characteristics and high-density recording capacity.

2. Description of the Related Art

Optical discs are generally adopted as information recording media of optical pickups which are capable of recording/reproducing information in a non-contact manner. The optical discs are divided into compact discs (CDs) and digital versatile discs (DVDs) according to information recording capacity. Here, mini discs (MDs) having a diameter of 65 mm or less may further be included.

Such recording discs may be subdivided into read only discs and rewritable discs. The read only discs include CD-ROM (Read Only Memory), DVD-ROM, and the like. The rewritable discs include CD-RW, CD-RAM (Random Access Memory), DVD-RW, DVD-RAM, and the like.

A CD has the whole thickness of 1.2 mm and is made from polycarbonate (PC). The CD is reproduced by a laser diode having a wavelength of 780 nm, a track pitch thereof is 1.6 μm, and has a single surface with an external diameter of 120 mm and a recording capacity of 650 MB.

A DVD can be formed to have a thickness of 1.2 mm by adhering a polycarbonate stiffening plate of a 0.6 mm thickness onto an information substrate of a 0.6 mm thickness so as to be compatible with CD drives. If a DVD is a single-sided disc having a diameter of 120 mm, recording capacity thereof is 4.7 GB. If a DVD is a double-sided disc, two discs having a thickness of 0.6 mm may be put into contact to have recording capacity of 9.4 GB. A DVD is reproduced by a laser diode having a wavelength of 635/650 nm and an object lens having a numerical aperture of 0.65, and track pitch thereof is about 0.74 μm. A DVD of a 80 mm diameter has recording capacity of 1.47 GB corresponding to recording capacity of two CDs.

A high-density (HD)-DVD is single-sided, has a diameter of 120 mm, and a recording capacity of about 250 GB. The HD-DVD is recorded/reproduced by a laser diode having a wavelength of 400 nm and an object lens having a numerical aperture (NA) of 0.85, and track pitch thereof is about 0.3 μm. An HD-DVD having a diameter of 80 mm has a recording capacity of about 7.8 GB.

An HD TV requires a disc capable of recording/reproducing an HD movie of two hours and fifteen minutes, has a diameter of about 120 mm, and has a recording capacity that is not standardized, but where about 23 GB of data can be recorded/reproduced.

The standards of a CD and a DVD are listed, respectively, in table 1.

TABLE 1

|  | CD | DVD |
| --- | --- | --- |
| Diameter (mm) | 120 | 120 |
| Thickness of whole disc (mm) | 1.2 | 1.2 |
| Thickness of information substrate (mm) | 1.2 | 0.6 |
| Track pitch (μm) | 1.6 | 0.74 |
| Minimum pit size (μm) | 0.83 | 0.4 |
| Wavelength of laser beam (nm) | 780 | 635/650 |
| Numerical aperture (NA) of object lens | 0.5 | 0.65 |
| Capacity of single substrate (GB) | 0.65 | 4.7 (1.47) |

A disc 1, such as a CD or a DVD, shown in FIG. 1 is divided into a central hole 10, a clamping area 20 which stably places the disc 1 on a turntable of a reproducing drive that will be described later, a lead-in area 30 on which information related to the disc 1 is recorded, a data area 40 on which user data is recorded, and a lead-out area 50 which is an end portion of an area for recording data.

The lead-in area 30 can record reproduction only data, such as the size of the disc 1, the number of tracks of a reading layer, copy protection information, or the like. User information can be recorded in or reproduced from the data area 40. Other information related to the disc 1 can be recorded in the lead-out area 50. Reference numeral 25 denotes a stack ring which prevents productivity reduction due to contact of a recording plane when stacking the manufactured disc in a disc injection molding.

A disc chucking apparatus for reading/reproducing the disc 1 is shown in FIG. 2. The disc chucking apparatus includes a spindle motor 60, a turntable 63, and a clamper 65. The spindle motor 60 rotates the disc 1. The turntable 63, on which the disc 1 is securely placed, is fixed to a shaft (not shown) of the spindle motor 60. The damper 65 clamps the disc 1 on the turntable 63. The disc 1 is clamped between the turntable 63 and the damper 65, and thus information can be reproduced from the disc 1 without swaying when the disc 1 rotates.

A protrusion 63a, which protrudes from the center of the turntable 63, is inserted into the central hole 10. A magnetic substance 64 is included in the turntable 63 or the damper 65 so as to fix the disc 1 by a magnetic force of the magnetic substance. Here, the clamping area 20 of the disc 1 contacts the damper 65.

In a general CD or DVD having a whole external diameter φt of 120 or 80 mm, a diameter of the central hole 10 is standardized to be 15 mm. An external diameter φc of the clamping area 20 is standardized to be about 32.7 mm.

Typically, the stack ring 25 between the clamping area 20 and the lead-in area 30 has an area size in a range of 6–12 mm. A diameter of the lead-in area 30 of the CD is standardized to be 46–50 mm and a diameter of the lead-in area 30 of the DVD is standardized to be 45.2–48 mm. Therefore, data area 40 of the CD and DVD has the internal diameter φd of 48.2 mm. In a case of a DVD+RW, the internal diameter φi of the lead-in area 30 is determined to be 44.0 mm. In a case of a disc having a diameter of 120 mm, an external diameter φoe of the lead-out area 50 is determined to be up to 117 mm. In a case of a disc having a diameter of 80 mm, an external diameter φoe of the lead-out area 50 is determined to be up to 78 mm.

In a case where a disc has a small diameter according to a trend of compacting the disc, e.g., in a case where the disc has a whole diameter of 64 mm, data recording capacity is not enough if, like a CD or DVD, a position φd where user data starts being recorded is 48.2 mm of the whole diameter φt of the disc (i.e., typically at most a data area size of about 12.8 mm). Furthermore, a data area substantially hardly exists if the above-described standard is adopted to a disc having a whole diameter φt of 50 mm (i.e., at most a data area size of about 0.8 mm). If the central hole 10 of a disc is smaller than 15 mm to compensate for the insufficient data area, a disc having a diameter of 120 or 80 mm would not be compatible with a standard or typical disc drive.

There is another method of reducing the size of the clamping area 20 to secure a recording capacity of a disc. The size of the clamping area 20 depends on deflection components of the disc, the number of rotations of the spindle motor 60, or a clamping force of the disc. However, because vibration characteristics of the disc are deteriorated with a reduction in the clamping area 20, there are certain limitations in reducing the clamping area 20. The clamping area 20 has a diameter φc up to 33.0 mm according to a disc chucking standard. In particular, the spindle motor 60 for most of CD-ROMs or DVD-ROMs has an external diameter of 28.0 mm or less and the turntable 63 has an external diameter of 33.0 mm or less, which can satisfy a clamping area 20 diameter of up to 33.0 mm of the disc.

Therefore, in a case where a compact disc is provided taking into consideration portability (compatibility), recording capacity is reduced with a reduction in the diameter of the disc and sufficient data cannot be recorded on the disc. Also, by reducing the diameter of the disc, repeated recording is limited, and thus limiting free editing of the data, which is an obstacle to adding value to the data. Accordingly, a new standard of high-density optical discs is required so that high-density recording capacity is secured and compact discs are compatible with existing disc reproducing drives.

SUMMARY OF THE INVENTION

To solve at least the above-described problems, it is an object of the present invention to provide a high-density compact disc compatible with an existing disc drive and capable of securing (providing) high-density recording capacity.

Additional objects and advantages of the invention will be set forth in part in the description which follows and, in part, will be obvious from the description, or may be learned by practice of the invention.

Accordingly, to achieve the above and other objects of the invention, there is provided a high-density optical disc having a whole diameter in a range of 80 mm or less to 28 mm (i.e., a whole diameter in range of 28–80 mm), a whole thickness of 0.3–0.7 mm, and a position where data starts being recorded within a range of 27–38 mm of the whole diameter.

According to an aspect of the invention, the high-density optical disc includes at least one substrate and at least one cover layer having a thickness in a range of 0.2 mm or less to 0.1 mm.

According to an aspect of the invention, the high-density optical disc includes a central hole having a diameter in a range of 10–15 mm.

According to an aspect of the invention, the high-density optical disc includes a clamping area having an external diameter in a range of 26 mm or less to 20 mm.

According to an aspect of the invention, the high-density optical disc includes a groove track and a land track. Here, data is recorded on at least one of the groove track and the land track.

According to another embodiment of the invention, there is a high-density optical disc including a central hole, a clamping area, a data area in which user data is recorded, a lead-in area which is inside the data area, and a lead-out area which is outside the data area. Here, the high-density optical disc has a whole diameter in a range of 80 mm or less to 28 mm and a whole thickness in a range of 0.3–0.7 mm, the lead-in area has an internal diameter in a range of 27–38 mm, and a start position of the data area is within (in) a range of 33–45 mm of the whole diameter.

According to an aspect of the invention, the external diameter of the data area is in a range of 39–44 mm.

According to an aspect of the invention, the external diameter of the data area is in a range of 62–64 mm.

According to an aspect of the invention, the external diameter of the data area is in a range of 76–79 mm.

BRIEF DESCRIPTION OF THE DRAWINGS

The above and other objects and advantages of the present invention will become more apparent by describing in detail preferred embodiments thereof with reference to the attached drawings in which.

DETAILED DESCRIPTION OF THE PREFERRED EMBODIMENTS

Figure 1:
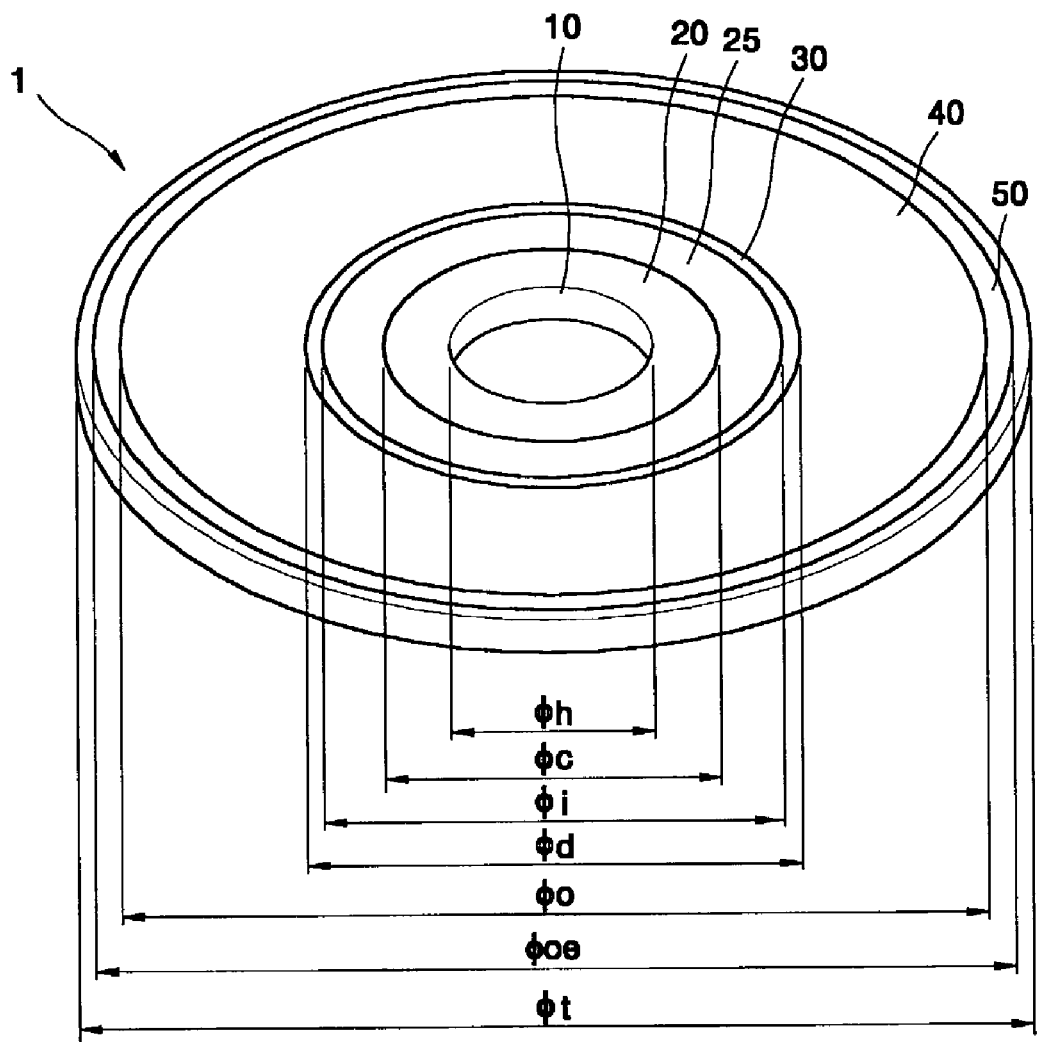
FIG. 1 is a perspective view of a conventional high-density optical disc.
Figure 2:
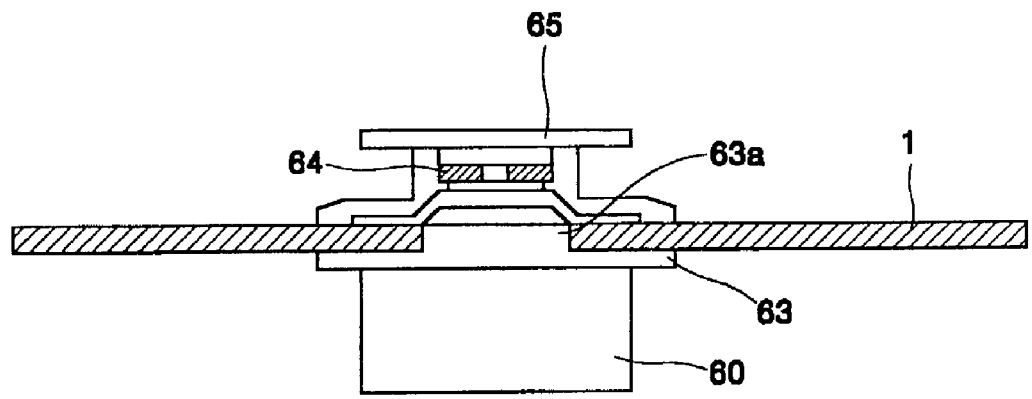
FIG. 2 is a cross-sectional view of a conventional disc clamped to a disc drive.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
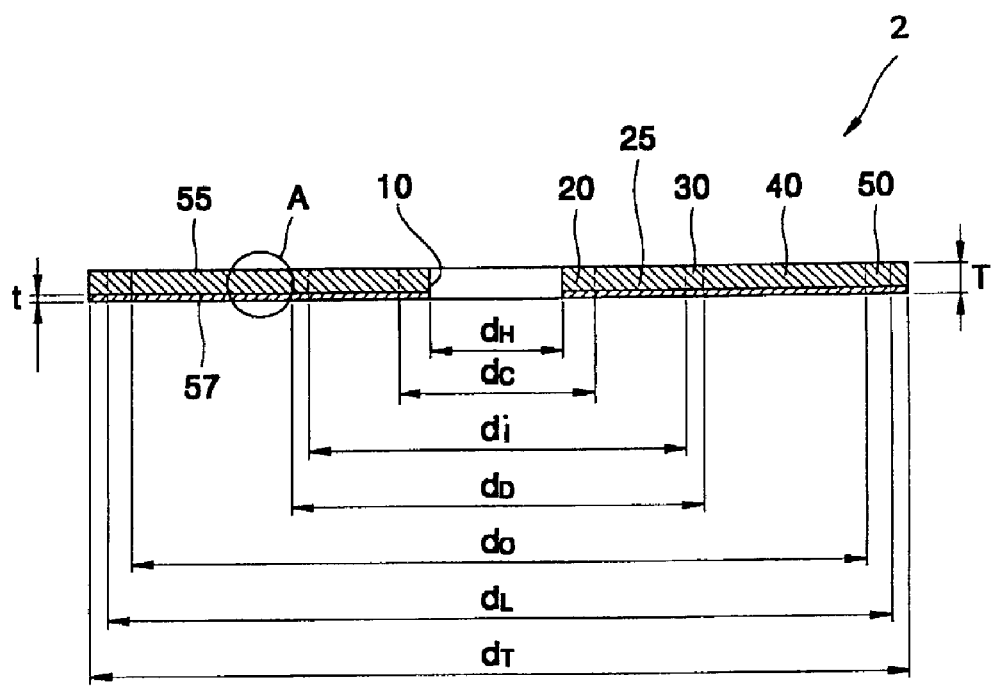
FIG. 3 is a cross-sectional view of a high-density optical disc according to an embodiment of the present invention.

FIG. 3 is a cross-sectional view of a high-density optical disc according to an embodiment of the present invention. In FIG. 3, the same elements as those of FIG. 1 denote the same elements. A high-density optical disc 2 comprises a central hole 10, a clamping area 20, a data area 40, a lead-in area 30, and a lead-out area 50. A clamping force is applied to the clamping area 20. User data is recorded in the data area 40. The lead-in area 30 is adjacent to the inside of the data area 40. The lead-out area 50 is adjacent to the outside of the data area 40. The high-density optical disc 2 has the whole diameter dT of 80 mm or less to 28 mm and the whole thickness T of 0.3–0.7 mm. A start position where data can be recorded can be in a range of 27–45 mm of the whole diameter dT. Further, a start position of the data area 40 can be within (in) a range of 33–45 mm of the whole diameter dT of the disc 2.

In the present invention, the central hole 10 has a size within a range of 10–15 mm, more particularly, has a diameter dH of 10 mm in consideration of compatibility with an existing disc drive. Also, a size Ca of the clamping area 20 is minimized to secure (allow) high-density recording capacity of the disc. However, it is important to maintain or improve recording/reproducing characteristics of the disc 2 when reducing the size Ca of the clamping area 20. The recording/reproducing characteristics, which are much affected by the size Ca of the clamping area 20, are vibration characteristics of the disc when the disc is rotating. In other words, the data area 40 becomes wider with a reduction in the clamping area 20, increasing vibration characteristics. Deterioration of the vibration characteristics of the disc 2 cause a bad effect on the recording/reproducing characteristics of the disc.

Figure 4:
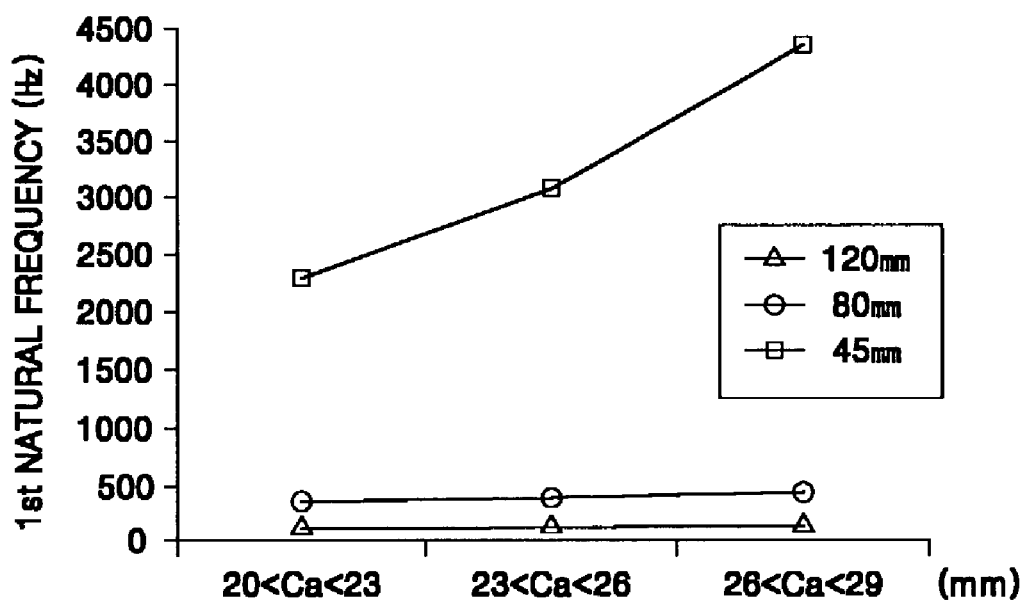
FIG. 4 is a graph illustrating a first natural frequency according to sizes of a clamping area of a disc, with respect to each diameter of the disc, according to an embodiment of the invention.

Changes in a first natural frequency of discs according to the size Ca of the clamping area 20 are simulated and simulated results are shown in table 2 and FIG. 4. In particular, external diameters dC of the clamping area 20 in a range of 20–29 mm are used in the simulation. Further, it is assumed for simulation purposes only that the discs have a whole thickness of 1.2 mm and characteristics of a material thereof are shown in table 3.

TABLE 2

| Mode of each external diameter of disc of 1.2 mm thickness | Clamping area (mm) | | |
|---|---|---|---|
| | 20 < Ca < 23 | 23 < Ca < 26 | 26 < Ca < 29 |
| First Mode | | | |
| Diameter 120 mm | 111 Hz | 120 Hz | 129 Hz |
| Diameter 80 mm | 334 Hz | 376 Hz | 425 Hz |
| Diameter 45 mm | 2296 Hz | 3079 Hz | 4342 Hz |

TABLE 3

| Characteristic | Characteristic value |
|---|---|
| Material | Polycarbonate |
| Elastic Coefficient | 20,000 kgf/cm$^2$ |
| Density | 1.20E3 kg/m$^3$ |
| Poisson's Ratio | 0.37 |

In table 2 and FIG. 4, it can be seen that in a case of a compact disc having a diameter of 45 mm, the first natural frequency is greatly affected by minute changes in the size of the clamping area 20. Also, it can be seen that discs having diameters of 80 mm and 120 mm are almost unaffected by changes in the size of the clamping area 20. Here, a servo is affected when the first natural frequency is similar to a rotation frequency band of a disc. In the case of the disc having a diameter of 45 mm, the first natural frequency is greatly affected by changes in the size of the clamping area 20. However, the first natural frequency is very different from a disc rotation frequency band of less than about 100 Hz of a current (conventional) optical disc drive, and thus the servo is not greatly affected.

Figure 5:
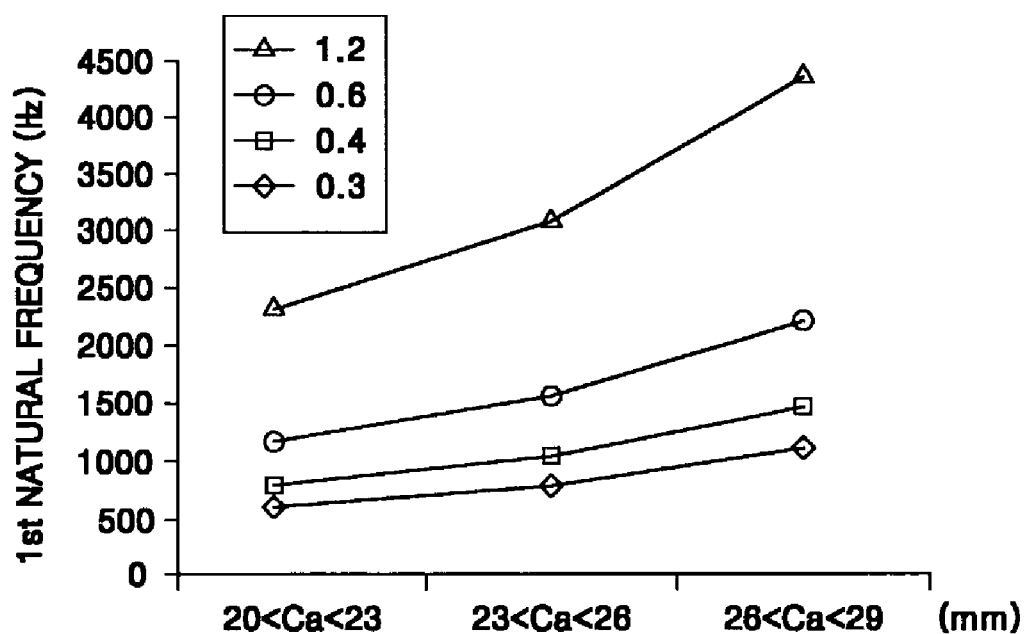
FIG. 5 is a graph illustrating a first natural frequency according to sizes of a clamping area of a disc, with respect to each thickness of the disc, according to an embodiment of the invention.

Further, a frequency is simulated according to thicknesses of the compact disc having a diameter dT of 45 mm and the simulated results are shown in table 4 and FIG. 5.

TABLE 4

| First Natural Frequency According to Each Disc Thickness | Clamping area (mm) | | |
|---|---|---|---|
| | 20 < Ca < 23 | 23 < Ca < 26 | 26 < Ca < 29 |
| First Natural Frequency | | | |
| 1.2 mm | 2296 Hz | 3097 Hz | 4342 Hz |
| 0.6 mm | 1161 Hz | 1560 Hz | 2208 Hz |
| 0.4 mm | 779 Hz | 1046 Hz | 1480 Hz |
| 0.3 mm | 588 Hz | 788 Hz | 1114 Hz |

In Table 4, it can be seen that the first natural frequency of the disc having a diameter dT of 45 mm is much affected by the whole thickness of the disc and changes in an external diameter of the clamping area. However, the first natural frequency is 588 Hz when the thickness of the disc is 0.3 mm in a state that the size Ca of the clamping area is reduced up to 20–23 mm. The first natural frequency 588 Hz is still much different from a disc rotation frequency band of a current (conventional) disc drive and a resonance frequency band, and thus it does not affect a servo.

Accordingly, in view of the simulation results, a whole diameter dT of the disc 2 can be set to 80 mm or less to 28 mm, if a whole thickness T of the disc can be set within a range of 0.3–0.7 mm, thereby providing a position where data can start being recorded within a range of 27–45 mm of the whole diameter dT of the disc. Of course, a position where data can start being recorded may be a position where information related to the disc starts being recorded in the lead-in area 30. Also, the high-density optical disc 2 comprises a cover layer 57 formed to have a thickness t of 0.2 mm or less to 0.1 mm and a substrate 55 in a direction where a laser beam is radiated, thereby allowing reduction of the whole thickness of the disc 2 to be within the range of 0.3–0.7 mm.

More particularly, the position where data starts being recorded has to be moved inside the disc as much as possible to increase recording capacity. To realize this, an external diameter dC of the clamping area 20 can be set to 26 mm or less, typically, within a range of 20–26 mm of the whole diameter dT. An internal diameter di of the disc where the lead-in area 30 starts may be within a range of 27–38 mm and an internal diameter dD of the disc where the data area 40 starts may be reduced to a range of 33–45 mm. Under these conditions, an external diameter do of the data area 40 can be limited to a range of 42–44 mm or 62–64 mm to realize high-density optical discs having the whole diameters of 45 and 65 mm. In a case where the diameter dT of the disc is to be 80 mm, the external diameter do of the data area 40 is set to a range of 76–78 mm and an external diameter dL of the lead-out area 50 is set to a range of 77–79 mm so as to secure a recording area size up to a range of 27–78 mm, providing a recording capacity of at least 9.4 GB which is similar to the recording capacity of a double-sided DVD having a diameter of 120 mm.

Three example embodiments of high-density optical discs 2 of the present invention will be described in detail.

A high-density optical disc according to a first embodiment of the present invention includes a central hole 10, a clamping area 20, a lead-in area 30, a user data area 40, and a lead-out area 50. The whole thickness T of the disc is within a range of 0.3–0.7 mm (typically 0.6 mm). Also, a diameter of the central hole 10 is within a range of 10–15 mm, a diameter of the clamping area 20 is within a range of 23–26 mm, a diameter of the lead-in area 30 is within a range of 33–36 mm, a diameter of the data area 40 is within a range of 36–76 mm, and a diameter of the lead-out area 50 is within a range of 76–78 mm. Thus, the whole diameter dT of the disc is 80 mm.

Here, a non-recording area 25 having a stack ring (not shown) is prepared between the clamping area 20 and the lead-in area 30 and the non-recording area 25 has an area size in a range of 9–12 mm. The stack ring prevents productivity reduction due to contact of recording plane when stacking the manufactured discs in a disc injection molding.

The high-density optical disc 2 includes at least one substrate 55 and at least one cover layer 57 as previously described. The cover layer 57 may have a thickness t of 0.2 mm or less to 0.1 mm. For example, there are two methods of manufacturing a transmission substrate (substrate and cover layer) having a diameter of 0.1 mm : performing spin-coating on a polycarbonate substrate having a predetermined thickness to a thickness of 0.1 mm; and adhering a sheet having a thickness of 0.1 mm by UV hardening. The high-density optical disc 2 may be a phase change disc or an optical magnetic disc.

Figure 6:
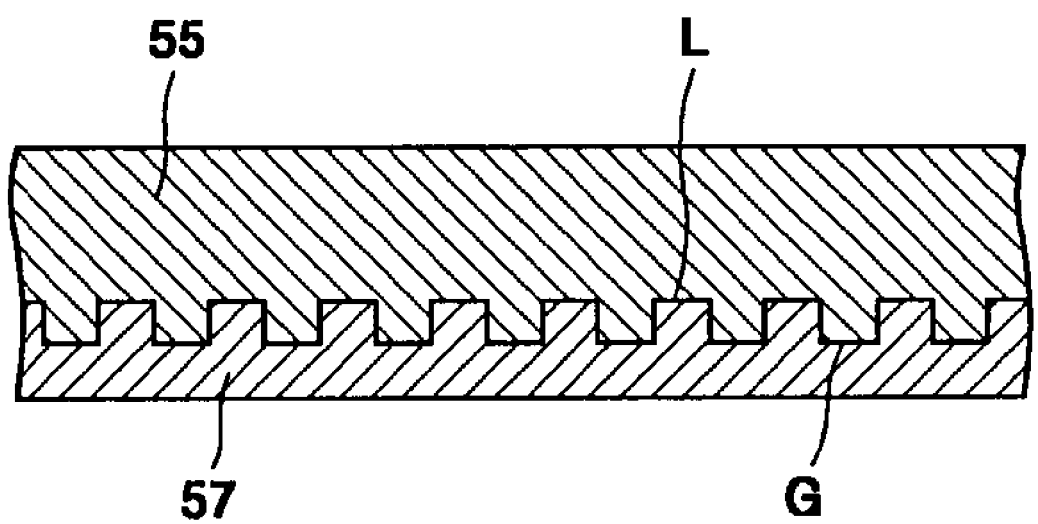
FIG. 6 is an enlarged view of a portion A shown in FIG. 3.

As shown in FIG. 6, a land track L and a groove track G are formed at the substrate 55 on the cover layer 57. Data can be recorded on at least one of the land track L and the groove track G. Multi-layered recording is possible on the substrate 55 or the cover layer 57.

According to an aspect of the invention, there is a method of narrowing a track pitch or reducing a minimum mark length (MML) to increase further the recording density of the high-density optical disc 2. However, the track pith or the MML may be changed depending on the design of a recording method, an error correction code (ECC), and modulation. For example, in a method of recording data on both the land track L and the groove track G, the track pitch is typically about 0.3 µm and the MML is typically about 0.21 µm. In a method of recording data only on the groove track G, the track pitch is typically about 0.325 µm and the MML is typically about 0.197 µm. A pickup (not shown) which records/reproduces data on/from the high-density optical disc 2 typically uses an objective lens having NA of 0.85 and a laser diode having a wavelength of 400 nm.

In the event that data is recorded on the high-density optical disc 2 according to the first embodiment under the above-described conditions, a recording capacity of 9.4 GB can be secured based on a single-sided recording disc. As described, the high-density optical disc 2 can considerably increase recording capacity, compared to an existing disc 1 having the same diameter as the high-density optical disc 2.

A high-density optical disc according to a second embodiment of the present invention includes a central hole 10, a clamping area 20, a lead-in area 30, a user data area 40, and a lead-out area 50. The whole thickness T of the disc is within a range of 0.3–0.7 mm (typically 0.4 mm). Also, a diameter dH of the central hole 10 is within a range of 10–15 mm, a diameter of the clamping area 20 is within a range of 23–26 mm, a diameter of the lead-in area 30 is within a range of 33–36 mm, a diameter of the data area 40 is within a range of 36–62 mm, and a diameter of the lead-out area 50 is within a range of 62–64 mm. Thus, the whole diameter of the disc is 65 mm. Accordingly, a recording capacity of 4.7 GB can be secured based on a single surface of the disc. The recording capacity is similar to the recording capacity of a single-sided DVD having a diameter of 120 mm.

A high-density optical disc according to a third embodiment of the present invention has the whole diameter of 45 mm. The whole thickness T of the disc is within a range of 0.3–0.6 mm (typically 0.4 mm), a diameter of the central hole 10 is within a range of 10–15 mm, a diameter of the clamping area 20 is within a range of 23–26 mm, a diameter of the lead-in area 30 is within a range of 33–36 mm, a diameter of the data area 40 is within a range of 36–42 mm, and a diameter of the lead-out area 50 is within a range of 42–44 mm. Here, when NA of an objective lens of an optical pickup is 0.85, a wavelength of a laser diode is 400 nm, a track pitch is 0.32 µm, an MML is 0.16 µm, and a recording capacity of 650 MB can be secured based on a single surface of the disc. Thus, the disc can have the whole diameter dT of 45 mm and a typical thickness of 0.4 mm so as to be compact and can secure a recording capacity of about 650 MB similar to a conventional CD.

Standards of the high-density optical discs 2 according to the first through third embodiments are shown in table 5.

TABLE 5

| | Standard | | |
|---|---|---|---|
| Disc diameter (mm) | 80 | 65 | 45 |
| Lead-out area (mm) | 76–78 | 62–64 | 42–44 |
| Data area (mm) | 36–76 | 36–62 | 36–42 |
| Lead-in area (mm) | 33–36 | 33–36 | 33–36 |
| Clamping area (mm) | 23–26 | 23–26 | 23–26 |
| Central hole (mm) | 10–15 | 10–15 | 10–15 |
| Recording capacity (GB) | 9.4 | 4.7 | 0.65 |
| Wavelength (nm) | 400 | 400 | 400 |
| Numerical aperture (NA) | 0.85 | 0.85 | 0.85 |
| Track pitch (µm) | 0.3/0.325 | 0.3/0.325 | 0.32 |
| Minimum mark length (L/G/G recording) (µm) | 0.21/.0197 | 0.21/.0197 | 0.16 |
| Disc thickness (mm) | 0.3–.07 | 0.3–.07 | 0.3–.06 |

Besides discs according to the first through third embodiments, a high-density optical disc 2 can have a thickness of 0.3–0.7 mm and a whole diameter of 80 mm or less to 28 mm, a position where data starts being recorded (i.e., di) can be within a range of 27–45 mm of the whole diameter, and a data area 40 can be set to various sizes. Thus, a disc having necessary recording capacity and size can be provided. In particular, for example, a disc having a diameter of 15 mm would be compatible with an existing CD or DVD reproducing drive.

In the high-density optical disc 2, the clamping area and the data area can be reset and the thickness of the disc can be reduced so as to maintain recording/reproducing characteristics of the disc, thereby allowing reduction in diameter of the disc 2 while maintaining high-density recording capacity and maintaining compatibility with existing disk drives. In particular, the central hole of the disc can be maintained and/or adjusted to an existing disc drive so that the existing disc drive can be used. As a result, portability and high-density recording capacity can be achieved while decreasing the diameter of the disc. More particularly, an existing disc drive can be used, the size of the high-density optical disc can be reduced, and high-density recording capacity can be secured.

Although a few preferred embodiments of the present invention have been shown and described, it would be appreciated by those skilled in the art that changes may be made in the embodiments without departing from the principles and spirit of the invention, the scope of which is defined in the claims and their equivalents.

What is claimed is:

1. A high-density optical disc comprising:
   a whole diameter of 80 mm or less;
   a whole thickness in a range of 0.3 to 0.7 mm; and
   a central hole, a clamping area, a data area in which user data is recorded, a lead-in area which is inside the data area, and a lead-out area which is outside the data area,
   wherein the lead-in area has an internal diameter in a range of 27 to 45 mm, the diameter of a start position of the data area is in a range of 36 to 48 mm, and a clamping area has an external diameter in a range of 20 to 26 mm.

2. The high-density optical disc of claim 1, wherein the central hole has a diameter in a range of 10–15 mm.

3. The high-density optical disc of claim 2, comprising at least one substrate and at least one cover layer, wherein the cover layer has a thickness in a range of 0.2 mm or less to 0.1 mm.

4. The high-density optical disc of claim 3, comprising a groove track and a land track formed at the substrate on the cover layer and data is recorded in at least any one of the groove track and the land track.

5. The high-density optical disc of claim 4, wherein an external diameter of the data area is in a range of 76–79 mm.

6. The high-density optical disc of claim 3, wherein an external diameter of the data area is in a range of 76–79 mm.

7. The high-density optical disc of claim 1, wherein an external diameter of the data area is in a range of 76–79 mm.

8. The high-density optical disc of claim 1, wherein a recording capacity of the disc is 9.4GB.

9. The high-density optical disc of claim 1, further comprising a transmission substrate comprising at least one substrate and at least one cover layer, wherein the cover layer has a thickness in a range of 0.2 mm to 0.1 mm.

10. The high-density optical disc of claim 9, wherein the transmission substrate is formed by performing spin-coating on a polycarbonate substrate having a predetermined thickness to a thickness of 0.1 mm or adhering a sheet having a thickness of 0.1 mm by UV hardening.

11. A high-density optical disc comprising:
    a whole diameter of 80 mm or less;
    a whole thickness in a range of 0.3–0.7 mm;
    a central hole having a diameter in a range of 10–15 mm;
    a clamping area having a diameter in a range of 23–26 mm;
    a lead-in area in which data starts being recorded and having a diameter in a range of 33–36 mm;
    a data area in which user data is recorded;
    a lead-out area which is outside the data area;
    at least one substrate; and
    at least one cover layer,
    wherein the cover layer has a thickness in a range of 0.2 mm or less to 0.1 mm, a diameter of the data area is in a range of 36–76 mm, and a diameter of the lead-out area is in a range of 76–78 mm.

12. The high-density optical disc of claim 11, further comprising a groove track and a land track, wherein data is recorded in at least one of the groove track and the land track.

* * * * *